(12) United States Patent
Whitlow et al.

(10) Patent No.: US 9,227,736 B2
(45) Date of Patent: Jan. 5, 2016

(54) METHODS AND APPARATUS FOR DETERMINING PILOT AWARENESS OF A SYSTEM-INITIATED CHANGE BASED ON SCANNING BEHAVIOR

(71) Applicant: HONEYWELL INTERNATIONAL INC., Morristown, NJ (US)

(72) Inventors: Stephen Whitlow, St. Louis Park, MN (US); Robert E. De Mers, Nowthen, MN (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 54 days.

(21) Appl. No.: 14/200,179

(22) Filed: Mar. 7, 2014

(65) Prior Publication Data

US 2015/0251771 A1     Sep. 10, 2015

(51) Int. Cl.
*G01C 23/00* (2006.01)
*B64D 45/00* (2006.01)
*G06K 9/00* (2006.01)
*G06F 21/32* (2013.01)

(52) U.S. Cl.
CPC ............ *B64D 45/00* (2013.01); *G06K 9/00604* (2013.01); *B64D 45/0015* (2013.01); *B64D 2045/004* (2013.01); *G06F 21/32* (2013.01)

(58) Field of Classification Search
CPC .............. G06F 21/32; B60R 2325/302; B64D 2045/0055; B64D 45/0015; B64D 2045/004; B64D 45/00; G06K 9/00604

USPC ............................ 701/3, 4, 14; 340/5.82, 945
See application file for complete search history.

(56) References Cited

U.S. PATENT DOCUMENTS

| | | | |
|---|---|---|---|
| 6,658,572 B1 * | 12/2003 | Craig | 726/16 |
| 6,810,310 B1 * | 10/2004 | McBain | 701/3 |
| 7,946,483 B2 * | 5/2011 | Miller et al. | 235/382 |
| 8,374,687 B2 | 2/2013 | Mathan et al. | |

(Continued)

FOREIGN PATENT DOCUMENTS

| | | |
|---|---|---|
| EP | 2167920 A2 | 3/2010 |
| EP | 2434465 A2 | 3/2012 |
| EP | 2434469 A2 | 3/2012 |

OTHER PUBLICATIONS

Sandeep Mulgund, et al.; Situation Awareness Modeling and Pilot State Estimation for Tactical Cockpit Interfaces; Presented at HCI International, San Francisco, CA, Aug. 1997.

(Continued)

*Primary Examiner* — Gertrude Arthur Jeanglaude
(74) *Attorney, Agent, or Firm* — Ingrassia Fisher & Lorenz, P.C.

(57) ABSTRACT

A method for assessing and responding to a level of awareness of a flight crew member onboard an aircraft is provided. The method assesses an eye-scanning behavior of the flight crew member to determine whether the flight crew member is aware of a system-initiated change to a flight parameter; and when the flight crew member is not aware of the system-initiated change, orients the flight crew member to the system-initiated change.

20 Claims, 7 Drawing Sheets

(56) References Cited

U.S. PATENT DOCUMENTS

| | | |
|---|---|---|
| 2005/0030184 A1 | 2/2005 | Victor |
| 2006/0220883 A1 | 10/2006 | Matos |
| 2007/0050100 A1* | 3/2007 | Gustafson et al. ............... 701/3 |
| 2008/0023254 A1 | 1/2008 | Prost-Fin et al. |
| 2012/0075122 A1 | 3/2012 | Whitlow et al. |
| 2012/0092172 A1 | 4/2012 | Wong et al. |
| 2012/0130563 A1* | 5/2012 | McBain ............................ 701/3 |
| 2013/0245860 A1 | 9/2013 | Cooper |

OTHER PUBLICATIONS

H.H. (Henk) Hesselink, et al.; On-Board Decision Support Through the Integration of Advanced Information Processing and Human Factors Techniques: The POWER Project, Paper presented at the RTO SCI Lecture Series on "Tactical Decision Aids and Situational Awareness", held in Amsterdam, The Netherlands, Nov. 1-2, 2001.

EP Extended Search Report for Application No. EP 15 156 196.6, Dated Jul. 16, 2015.

* cited by examiner

| SPEED | ALT*<br>GS | HDG<br>LOC | CAT 3<br>DUAL<br>MDA 218 | AP 1+2<br>1 FD 2<br>A/THR |
|---|---|---|---|---|
| 502 | 504 | 506 | 508 | 510 |
| AUTO THRUST MODE | VERTICAL MODE | LATERAL MODE | APPROACH CAPABILITIES | AUTO FLIGHT STATUS |
| TOGA<br>FLX 42<br>MCT<br>CLB<br>IDLE<br>ASYM<br>A. FLOOR<br>TOGA LK<br>THR LK<br>MAN TOGA<br>MAN FLEX<br>MAN MCT<br>THR MCT<br>THR CLB<br>THR LVR<br>THR SPEED<br>THR IDLE<br>SPEED<br>MACH<br>LVR CLB<br>LVR MCT<br>LVR ASYM | SRS<br>ALT<br>ALT*<br>ALT CRZ<br>ALT CST<br>V/S<br>CLB<br>DES<br>OP CLB<br>EXP CLB<br>EXP DES<br>G/S<br>FINAL<br>V/S ± XXXX<br>FPA ± X.X | RWY<br>RWY TRK<br>GA TRK<br>TRACK<br>HDG<br>NAV<br>LOC<br>LOC*<br>APP NAV | CAT 1<br>CAT 2<br>CAT 3 SINGLE<br>CAT 3 DUAL<br>DH XXX<br>MDA XXXX | AP1<br>AP 2<br>AP 1+2<br>1FD2<br>1FD<br>FD2<br>1FD1<br>2FD2<br>2FD<br>FD1<br>A/THR |

| COMBINED MODES |
|---|
| LAND<br>FLARE<br>ROLL OUT<br>FINAL APP |
| FMA MESSAGES |
| USE MAN PITCH TRIM<br>MAN PITCH TRIM ONLY<br>DECELERATE<br>MORE DRAG<br>VIRTICAL DISCON AHEAD<br>CHECK APP SEL<br>SET GREEN DOT SPD<br>SET HOLD SPEED<br>MACH SEL .XX<br>SPEED SEL XXX |

METHODS AND APPARATUS FOR DETERMINING PILOT AWARENESS OF A SYSTEM-INITIATED CHANGE BASED ON SCANNING BEHAVIOR

TECHNICAL FIELD

Embodiments of the subject matter described herein relate generally to determining flight crew member awareness of a change in a flight parameter. More particularly, embodiments of the subject matter relate to analyzing eye-scanning behavior to determine awareness of a system-initiated change in a flight parameter.

BACKGROUND

Flight crew members of modern, highly-automated aircraft are tasked with maintaining awareness of many flight critical parameters and auto-flight modes. While there are many safety sub-systems that will alert pilots to unsafe operation conditions, these are designed to be "the last line of defense", and often come very late in an evolving unsafe situation. As a result, they often induce a startle response in the pilot during a flight critical phase, such as final approach, where pilot workload and stress are already high. Unfortunately, these alerts can occur too late for a pilot to orient themselves to the situation and execute the correct recovery action.

The operating assumption is that if information is presented via a flight display element in the aircraft, a flight crew member is aware of it. This assumption is countered by substantial research and multitudes of accidents and incidents where flight crew members were unaware of even the most salient and incessant visual and/or audio alerts. While flight crew members are trained to conduct stereotypic, regular scans of instruments, research also indicates that most flight crew members, and even flight instructors, do not do so. This scan is designed to insure that flight crew members regularly sample the state of flight critical parameters, such as airspeed, altitude, auto-flight mode, engine state, and vertical speed. However, if flight crew members do not adequately review some flight deck display element, they may not comprehend the import of a change. In some cases, a flight crew member could briefly look at a display element without registering the mission impact (e.g., "looking but not seeing"). This is particularly important in single pilot operations where the pilot flying does not have a pilot monitor whose primary responsibility is to monitor for such changes.

Another exacerbating factor is that auto-flight systems have authority to transition automated modes without requiring flight crew acknowledgment, which is often only indicated by a subtle change on a mode annunciation display. During heavy task loads, flight crew members are frequently unaware of these changes or the communication of the change somehow fails despite using commonly accepted crew resource management (CRM) practices.

Accordingly, it is desirable to assess awareness of changes, especially flight mode changes, to ensure that a flight crew member is, in fact, aware of the airplane state to support decision making and intervention if necessary. Furthermore, other desirable features and characteristics will become apparent from the subsequent detailed description and the appended claims, taken in conjunction with the accompanying drawings and the foregoing technical field and background.

BRIEF SUMMARY

Some embodiments provide a method for assessing and responding to a level of awareness of a flight crew member onboard an aircraft. The method assesses an eye-scanning behavior of the flight crew member to determine whether the flight crew member is aware of a system-initiated change to a flight parameter; and when the flight crew member is not aware of the system-initiated change, orients the flight crew member to the system-initiated change.

A system for determining and responding to a level of awareness of a flight crew member with regard to system-initiated changes onboard an aircraft is provided. The system includes a flight parameter analysis module, configured to identify an automatically executed conversion of an existing flight mode of the aircraft; an eye-tracking module, configured to sense an eye-scanning behavior of the flight crew member inside the aircraft; a data analysis module, configured to evaluate the eye-scanning behavior of the flight crew member to determine awareness of the flight crew member of the automatically executed conversion of the existing flight mode; and a notification module, configured to orient the flight crew member to the automatically executed conversion of the existing flight mode, when the data analysis module determines that the flight crew member is unaware of the automatically executed conversion.

A non-transitory, computer-readable medium containing instructions thereon, which, when executed by a processor, perform a method, is provided. The method determines, with an onboard monitoring subsystem of an aircraft, that a flight crew member is unaware of a system-initiated change to an operating parameter; and presents a notification of the system-initiated change to the flight crew member.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented herein relates to methods and apparatus used to ensure that a flight crew member, onboard an aircraft, is aware of a system-initiated change to a critical flight parameter. A system-initiated change includes any change that is automatically executed by a system onboard an aircraft, without requiring input or decision-making on the part of a flight crew member. Often, the occurrence of such changes goes unnoticed by a flight crew member, and the ongoing existence of the changed flight parameter may remain unnoticed by a flight crew member. A system-initiated change to a critical flight parameter may include an automatically executed transition and/or termination of an existing flight control mode. In certain embodiments, the system-initiated change to a critical flight parameter is an automatically executed change in flight mode during a particular phase of flight. In some embodiments, awareness of the flight crew member is determined by identifying an eye-scanning region and/or a display element related to the system-initiated change and analyzing the eye-scanning behavior of the flight crew member with regard to the display element.

Figure 1:
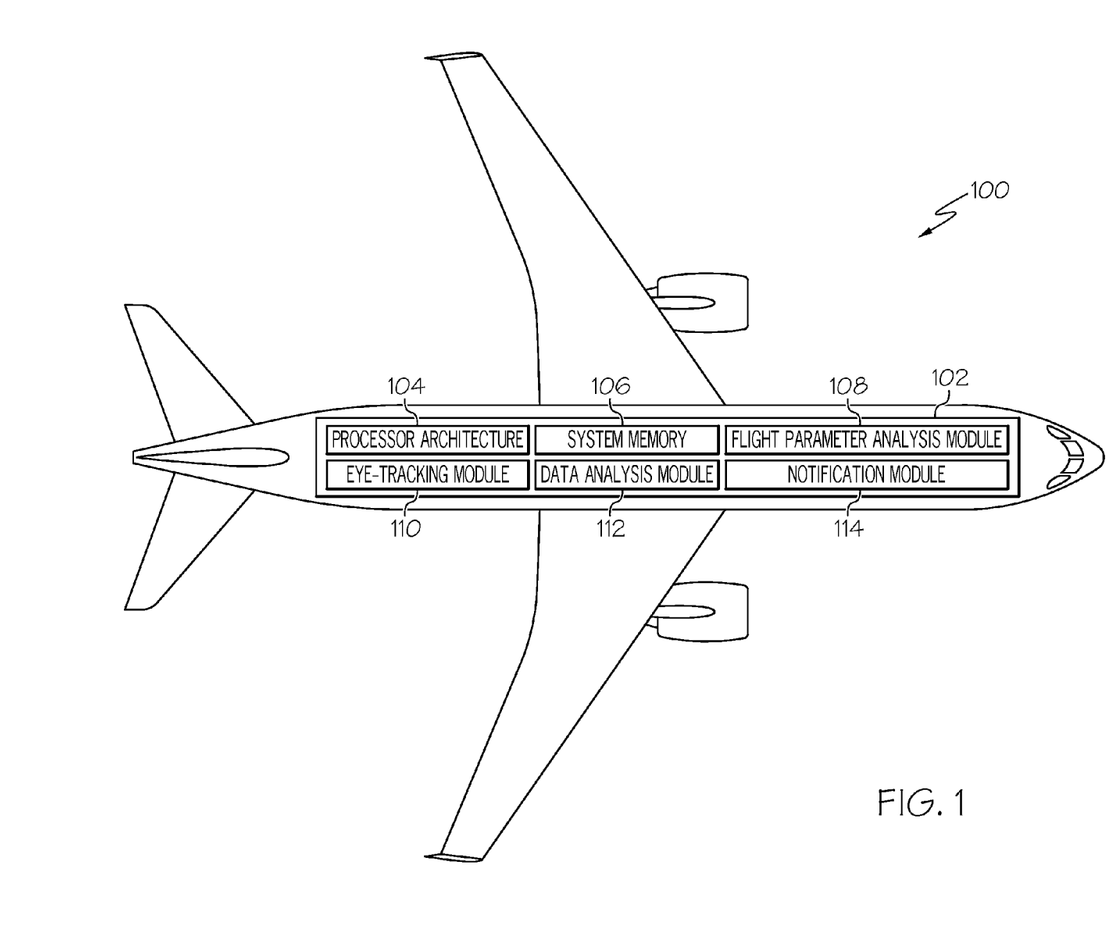
FIG. 1 is a functional block diagram of an aircraft, including an awareness monitoring system, in accordance with an embodiment.

Referring now to the drawings, FIG. 1 is a functional block diagram of an aircraft 100, including an awareness monitoring system 102, in accordance with an embodiment. The aircraft 100 may be any aircraft that includes eye-tracking technology (e.g., an eye-tracking module 110), as described below. As depicted, the awareness monitoring system 102 includes, without limitation, a processor architecture 104; a system memory 106; a flight parameter analysis module 108; an eye-tracking module 110; a data analysis module 112; and a notification module 114. These elements and features of the awareness monitoring system 102 may be operatively associated with one another, coupled to one another, or otherwise configured to cooperate with one another as needed to support the desired functionality—in particular, determining awareness of a flight crew member following a system-initiated change, as described herein. For ease of illustration and clarity, the various physical, electrical, and logical couplings and interconnections for these elements and features are not depicted in FIG. 1. Moreover, it should be appreciated that embodiments of the awareness monitoring system 102 will include other elements, modules, and features that cooperate to support the desired functionality. For simplicity, FIG. 1 only depicts certain elements that relate to the techniques described in more detail below.

The processor architecture 104 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the processor architecture 104 may be realized as one or more microprocessors, controllers, microcontrollers, or state machines. Moreover, the processor architecture 104 may be implemented as a combination of computing devices, e.g., a combination of digital signal processors and microprocessors, a plurality of microprocessors, one or more microprocessors in conjunction with a digital signal processor core, or any other such configuration.

The system memory 106 may be realized using any number of devices, components, or modules, as appropriate to the embodiment. Moreover, the awareness monitoring system 102 could include system memory 106 integrated therein and/or system memory 106 operatively coupled thereto, as appropriate to the particular embodiment. In practice, the system memory 106 could be realized as RAM memory, flash memory, EPROM memory, EEPROM memory, registers, a hard disk, a removable disk, or any other form of storage medium known in the art. In certain embodiments, the system memory 106 includes a hard disk, which may also be used to support functions of the awareness monitoring system 102. The system memory 106 can be coupled to the processor architecture 104 such that the processor architecture 104 can read information from, and write information to, the system memory 106. In the alternative, the system memory 106 may be integral to the processor architecture 104. As an example, the processor architecture 104 and the system memory 106 may reside in a suitably designed application-specific integrated circuit (ASIC).

The flight parameter analysis module 108 is suitably configured to monitor communications between flight systems to determine when a system-initiated change in flight mode has occurred. In certain embodiments, the flight parameter analysis module 108 detects changes by comparing a current value of a communicated parameter on an Avionics Standard Communications Bus (ASCB), such as a flight control mode, with a prior value of the communicated parameter that has been stored in memory.

In practice, the flight parameter analysis module 108 may be implemented with (or cooperate with) the processor architecture 104 to perform at least some of the functions and operations described in more detail herein. In this regard, the flight parameter analysis module 108 may be realized as suitably written processing logic, application program code, or the like. A system-initiated change is a change that has been executed automatically, without input from a flight crew member. Such changes may or may not be noticed by a flight crew member. In certain embodiments, system-initiated changes can be determined by monitoring the avionics communications bus for indications that the mode has changed. The Flight Management System (FMS) and Automatic Flight Controls are the automated systems that control the motion and behavior of the aircraft. In response to an aircraft state, environmental condition, or pilot action, the FMS will generate a mode change event. These events are normally just shared between avionics systems via digital communication on the Aircraft Standard Communication Bus (ASCB), but they could also be used to feed the flight parameter analysis module 108. The ASCB support communication among avionics subsystems using a standard protocol. The flight parameter analysis module could detect changes by comparing the current value of some parameter, such as a flight control mode, with the prior value stored in memory. The same message that generates a change in the mode annunciator panel can be sent to the flight parameter analysis module 108.

Generally, there is a mapping between a current phase of flight and appropriate flight control modes for that particular phase of flight. A phase of flight may be defined as a period, within a flight, during which a standard high-level set of activities is performed by flight crew members. Phases of flight may include, without limitation: Pre-flight, Engine Start, Pushback, Taxi, Take-off, Climb, Cruise, Descent, Holding, Approach, Final Approach, Landing, Taxi and Post Flight Operations. An automatic flight system (AFS) controls the aircraft in the pitch, roll and yaw axes. The AFS also controls the aircraft speed and engine thrust, and includes auto-throttle, automatic pilot (AP), and flight director (FD) subsystems which enact modes of control. The role of the auto-throttle is to automatically adjust the thrust of the engines so the aircraft achieves a desired flight characteristic in terms of speed and thrust. In Speed Mode, the auto-throttle will maintain an aircraft speed within safety margins. In Thrust Mode, the engine maintains a power setting based on phase of flight. During takeoff, the auto-throttle would maintain constant Takeoff power; while in Descent, auto-throttle set throttle to idle. The AP and FD support many lateral and vertical navigation modes. Lateral Navigation (LNAV) is the route flown over the ground. Air Traffic Control (ATC) provides routing that is entered into the flight computer to assign waypoints along the lateral path. The aircraft 100 may be using heading (HDG), VHF omnidirectional radio ranges (VORs), global positioning system (GPS), distance measuring equipment (DME), or the like. As long as the autopilot is engaged in the LNAV mode, it will follow that line across the ground. Vertical Navigation (VNAV) determines the altitudes at particular waypoints on the flight path. The VNAV operating modes include: level change (LVL CHG), vertical speed (VS), altitude hold (ALT HLD), and altitude (ALT). There are modes that combine LNAV and VNAV for specific phases of flight, Landing and Go-Around.

In general, modes refer to some level of automatic control of the aircraft. Technically, manual control is also a mode. The Flight Control System (FCS) is the first level of automation, and allows for individual control of different aspects of the flight: speed hold, altitude hold, heading hold, etc. The FCS also has the capability to provide flight path guidance. Guidance cues will be shown on the pilot displays, indicating how they should manually fly the aircraft in order to meet a time or flight path target. The next level of automation is the FMS, which provides fully automated control of all aspects of the flight: horizontal position, vertical position, and speed. The FMS incorporates all the features of the flight controls. Complications arise when, in certain embodiments, specific pieces (and/or combinations of pieces) of the systems are controlled automatically while other pieces (and/or combinations of pieces) of the systems are controlled manually. For example, speed and altitude may be controlled manually, while the system automatically controls the horizontal position. Additional complications arise when a flight crew member mistakenly believes that AFS support, such as auto-throttle support, has been activated. Auto-throttle support operates to keep aircraft above a minimum speed. However, in this scenario, the flight crew member may have provided manual thrust input earlier in the process, which disables auto-throttle support. Here, the flight crew member may be unaware that the auto-throttle support has been disabled, and decision-making is affected.

The eye-tracking module 110 is configured to monitor the eye-scanning behavior of one or more flight crew members inside the aircraft 100. Generally, flight crew members visually monitor and/or scan a plurality of flight displays, controls, gauges, and the like, on the inside of the aircraft 100 during flight. Analyzing eye-scanning behavior of a flight crew member provides information regarding what a flight crew member fixates in his line of sight, and the length of time that a flight crew member fixates on a particular area/region. The interior of the aircraft 100 may be divided up into a plurality of designated regions to facilitate eye-tracking. Each designated region may include one or more flight displays, and in exemplary embodiments, a designated region includes a small area to facilitate accurate eye-tracking. The eye-fixation of a flight crew member at each region may be monitored using eye-tracking technology. The eye-tracking module utilizes eye-tracking technology that is commonly known and used in the art. For example, an "eye tracker" (including optical sensors and near-infrared microprojectors) may be used. An eye tracker is a device that uses projection patterns and optical sensors to gather data about eye position, gaze direction or eye movements with very high accuracy. Most eye trackers are based on the fundamental principle of corneal reflection tracking. During typical operation, eye tracker microprojectors create reflection patterns on the eyes of a flight crew member, and optical sensors register an image of the flight crew member, the flight crew member's eyes, and the projection patterns. Typically, this occurs in real time. Image processing algorithms are used to locate specific features of the flight crew member, the flight crew member's eyes, and projection patterns, and mathematical models are then used to calculate an exact position of the flight crew member's eyes and point of eye-fixation (e.g., gaze point).

In certain embodiments, eye tracking sensors are located at the front of a cockpit or flight deck of an aircraft 100, below a series of displays. In some embodiments, eye tracking sensors are positioned in another location in the cockpit providing an unobstructed view of the eyes of the flight crew member(s). Current eye tracking sensors have a relatively small field of view, and one set is needed for each flight crew member. In fact, there may be a need for multiple sets of sensors for each flight crew member. For example, a set of eye tracking sensors may be positioned at the front of the flight deck to track eye-fixation when a flight crew member is looking forward, and a second set of eye tracking sensors may be positioned on one or more sides of the flight deck to track eye-fixation when the flight crew member is looking in the direction of a side. Generally, the most important displays are at the front of the flight deck (e.g., visible when a flight crew member turns his eyes forward), and one set of sensors, positioned at the front, per flight crew member, is sufficient for most situations.

The data analysis module 112 is configured to receive and analyze the eye-scanning data, obtained by the eye-tracking module 110. Eye-scanning data may include, without limitation, eye-fixation points and associated eye-fixation time values. Generally, eye-fixation points indicate various locations inside the aircraft 100 that the eye-tracking module 110 has determined that a flight crew member has viewed, and how much time the flight crew member spent gazing at a particular location.

In practice, the data analysis module 112 may be implemented with (or cooperate with) the processor architecture 104 to perform at least some of the functions and operations described in more detail herein. In this regard, the data analysis module 112 may be realized as suitably written processing logic, application program code, or the like. The data analysis module 112 analyzes eye-scanning data to determine whether the flight crew member is aware of automatically executed changes to critical flight parameters, such as a change in flight mode. Generally, awareness of the flight crew member is based on the amount of time spent looking at an identified eye-scanning region including the display element, the cognitive complexity of the display element, the current phase of flight, and a fatigue level of the flight crew member, and any other factors affecting the stress level, workload, and time required to process/understand information presented by a display element.

The notification module 114 is configured to orient a flight crew member to an automatic change in a critical flight parameter. Generally, the notification module 114 is configured to bring the change to the attention of a flight crew member who is unaware that the change has occurred. Generally, a critical flight parameter may include, without limitation: an aircraft automation state, heading change, altitude change, speed change, vertical speed change, and/or degree of pitch or roll. In other embodiments, critical flight parameters may include, without limitation: a system failure; a message from Air Traffic Control (ATC) received via voice radio or digital datalink; an environmental event; communications from nearby aircraft using automatic dependent surveillance broadcast (ADS-B); a traffic warning via a traffic collision avoidance system (TCAS); a ground proximity warning; and/or a stall warning. In certain embodiments, the notification module 114 alerts the flight crew member to a system-initiated change when the awareness monitoring system 102 has determined that the flight crew member has not demonstrated awareness of the change, based on eye-scanning behavior of the flight crew member.

The notification module 114 may present visual and/or auditory alerts regarding the system-initiated change. In embodiments using dual crew operations, where neither flight crew member is aware of the automatically executed change, the notification module 114 may provide a custom voiced message to pilot audio headset of one or both of the flight crew members, or via cabin mounted speakers. In embodiments using single crew operations, the notification module 114 may generate a voiced message consistent with crew resource management (CRM), such as "Flight Control Mode Transition," or "Auto Pilot Off". Alternatively, or in combination with a voiced message, the notification module 114 may provide a blooming visual effect around a display region to attract the attention of the pilot. In certain embodiments, the blooming visual effect may include a slow visual pulse or a low frequency flash. In some embodiments, the notification module 114 may trigger the Master Caution and Warning lights. Continued lack of determined awareness and/or lack of response from flight crew members may generate a message transmitted from the aircraft 100 to a ground-based flight operations center or ATC for further action. For example, when a flight crew member is determined to be unaware of system-initiated changes, an outside agent may take control of the aircraft 100 in order to bring it to a safe landing.

Figure 2:
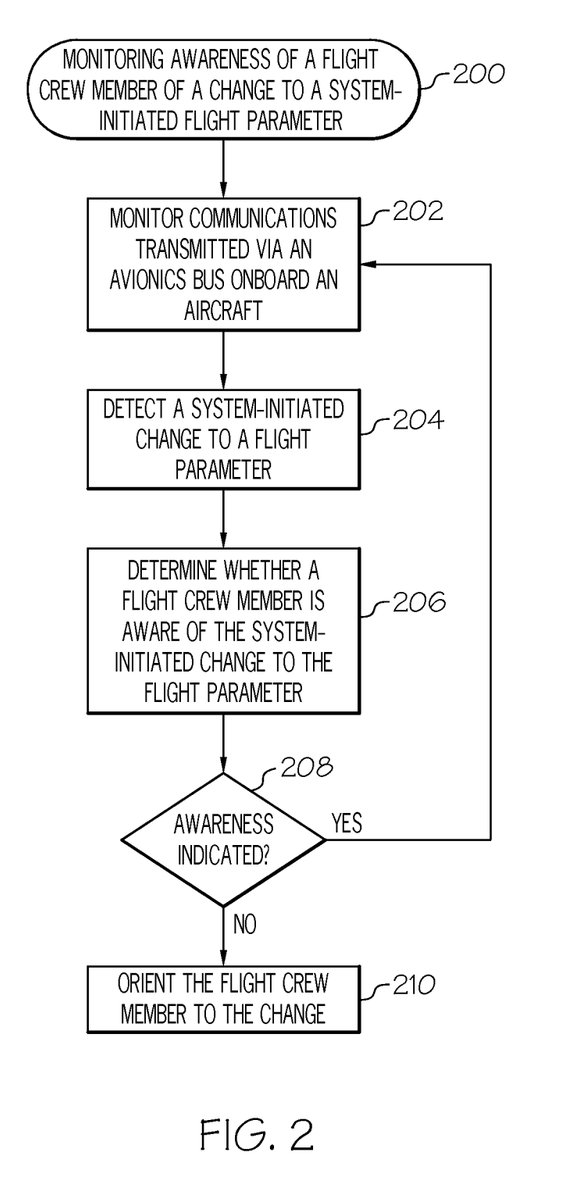
FIG. 2 is a flowchart that illustrates an embodiment of a process for monitoring awareness of a flight crew member of a change to a flight parameter.

FIG. 2 is a flowchart that illustrates an embodiment of a process 200 for monitoring awareness of a flight crew member of a system-initiated change to a flight parameter. The various tasks performed in connection with process 200 may be performed by software, hardware, firmware, or any combination thereof. For illustrative purposes, the following description of process 200 may refer to elements mentioned above in connection with FIG. 1. In practice, portions of process 200 may be performed by different elements of the described awareness monitoring system. It should be appreciated that process 200 may include any number of additional or alternative tasks, the tasks shown in FIG. 2 need not be performed in the illustrated order, and process 200 may be incorporated into a more comprehensive procedure or process having additional functionality not described in detail herein. Moreover, one or more of the tasks shown in FIG. 2 could be omitted from an embodiment of the process 200 as long as the intended overall functionality remains intact.

For ease of description and clarity, this example assumes that the process 200 begins by monitoring communications transmitted via an avionics bus onboard an aircraft (step 202). Flight systems, electronics, and devices onboard an aircraft are interconnected using an avionics communication bus, and the communications are monitored continuously. During monitoring of the communications transmitted via the avionics bus (step 202), the process 200 detects a system-initiated change to a flight parameter (step 204). In exemplary embodiments, changes to flight parameters include automatically executed modifications to existing flight control modes. In some embodiments, changes to flight parameters may include, without limitation, changes to: an aircraft automation state, heading change, altitude change, speed change, vertical speed change, degree of pitch or roll. In certain embodiments, the process 200 detects changes by comparing a current value of a flight parameter on ASCB, such as a flight control mode, with a prior value of the flight parameter stored in memory. In other embodiments, changes to flight parameters may include, without limitation: a system failure; a message from Air Traffic Control (ATC) received via voice radio or digital datalink; an environmental event; communications from nearby aircraft using automatic dependent surveillance broadcast (ADS-B); a traffic warning via a traffic collision avoidance system (TCAS); a ground proximity warning; and/or a stall warning. In some embodiments, instead of detecting a change to a flight parameter, the process 200 may detect "excessive" eye-fixation of a flight crew member on a certain defined area of the aircraft. Excessive eye-fixation may indicate that a flight crew member is drowsy or inattentive, triggering an action from the system. In this example, the process 200 detects that a normal scan pattern is not being followed by the flight crew member.

Once a system-initiated change to a flight parameter is detected (step 204), then the process 200 determines whether a flight crew member is aware of the system-initiated change (step 206). Generally, the system determines whether the flight crew member is aware of the system-initiated change by analyzing eye-scanning behavior of the flight crew member, discussed in more detail with regard to FIG. 3.

When the analyzed eye-scanning behavior indicates that the flight crew member is aware of the system-initiated change (the "Yes" branch of 208), then the process 200 continues monitoring communications transmitted via the avionics bus onboard the aircraft (step 202). When the analyzed eye-scanning behavior indicates that the flight crew member is not aware of the system-initiated change (the "No" branch of 208), then the process 200 orients the flight crew member to the system-initiated change (step 210). Orienting the flight crew member to a system-initiated change includes presenting a notification or alert to the flight crew member.

Figure 3:
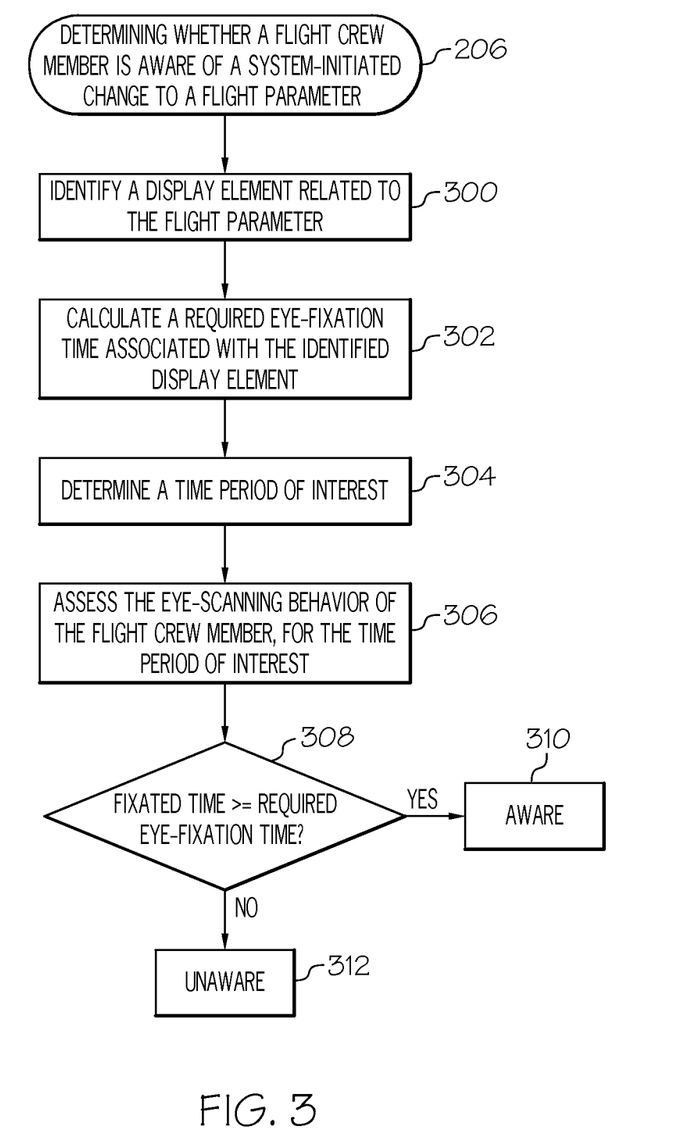
FIG. 3 is a flowchart that illustrates an embodiment of a process for determining whether a flight crew member is aware of a system-initiated change to a flight parameter.

FIG. 3 is a flowchart that illustrates an embodiment of a process 206 for determining whether a flight crew member is aware of a system-initiated change to a flight parameter. It should be appreciated that the process 206 described in FIG. 3 represents a more detailed view of step 206 described above in the discussion of FIG. 2. First, the process 206 identifies a display element related to the flight parameter (step 300). In certain embodiments, the process 206 also identifies an eye-scanning region that includes a display element. Generally, the interior of the aircraft is divided into identifiable regions or areas for which eye-scanning activity may be assessed. In some embodiments, an eye-scanning region may include a single display element, while in other embodiments, an eye-scanning region may include more than one display element. Alternatively, an eye-scanning region could be represented as a specific pattern of scanning different display elements. The display element may present a current setting for, or additional data relating to, the flight parameter itself. In certain embodiments where the display element is a flight mode annunciator, the flight parameter includes flight mode, altitude, airspeed, heading, and attitude.

Next, the process 206 calculates a required eye-fixation time associated with the identified display element and/or identified eye-scanning region (step 302). The required eye-fixation time is calculated each time the process 206 executes, due to the varying circumstances and factors present during each system-initiated change. The required eye-fixation time is the amount of time necessary for a flight crew member to focus (i.e., fixate) on a display element to become aware of a change in a flight parameter, and the flight parameter is associated with that particular display element. In other words, the required eye-fixation time is a minimum amount of eye-fixation time that indicates awareness of the flight crew member of a system-initiated change presented via the display element. Determining a required eye-fixation time involves determining how long a flight crew member needs to view a display element to understand the information presented, or in other words, to become aware of the system-initiated change to the flight parameter associated with the display element. Flight crew member comprehension of newly-presented information is affected by workload, stress level, and cognitive complexity of the new information and/or presentation of the new information. A heavy workload indicates that a flight crew member is responsible for a single highly-engaging task, such as keeping the aircraft straight and level in adverse weather, or completing multiple tasks quickly (e.g., simultaneously or during a short time period). Display elements present information with varying levels of complexity. Certain display elements present information in a highly complex manner, requiring an increased level of concentration, and consequently, increased viewing time from the flight crew member. The calculated required eye-fixation time is determined as a function of one or more of the following, without limitation: workload, stress level, current phase of flight, complexity of an identified display element and/or eye-scanning region, and/or an estimated level of fatigue of the flight crew member. One suitable methodology for calculating the required eye-fixation time is described below with reference to FIG. 4.

After calculating the required eye-fixation time associated with the identified display element (step 302), the process 206 determines a time period of interest (step 304). The time period of interest begins once the system-initiated change has occurred, and the end point is a dynamic value that is function of time sensitivity of detected change, current estimate of pilot workload, and complexity of display elements that depicts the change.

Once the time period of interest has been determined (step 304), the process 206 assesses the eye-scanning behavior of the flight crew member for the time period of interest (step 306). Here, the process 206 initiates the use of eye-tracking technology, which has the capability of determining what areas a flight crew member views, and how long the flight crew member views each area.

The process assesses the eye-scanning behavior of the flight crew member (step 306) to determine whether the flight crew member fixated on the identified display element for at least the required eye-fixation time during the time period of interest (step 308). When the flight crew member has fixated on the identified display element for a time period greater than or equal to the calculated required eye-fixation time (the "Yes" branch of 308), then the process 206 determines that the flight crew member is aware of a system-initiated change presented by the display element (step 310). However, when the flight crew member has not fixated on the identified display element for a time period greater than or equal to the calculated required eye-fixation time (the "No" branch of 308), then the process 206 determines that the flight crew member is unaware of a system-initiated change presented by the display element (step 312).

For example, the process may calculate a required eye-fixation time of 2-3 seconds associated with Display Element A. Then, using eye-tracking technology, the process 206 may determine that a flight crew member has viewed Display Element A (or the region containing Display Element A) for 6 seconds. In this example, the flight crew member viewed Display Element A for a time that was longer than adequate to indicate awareness of a change reflected by Display Element A.

Figure 4:
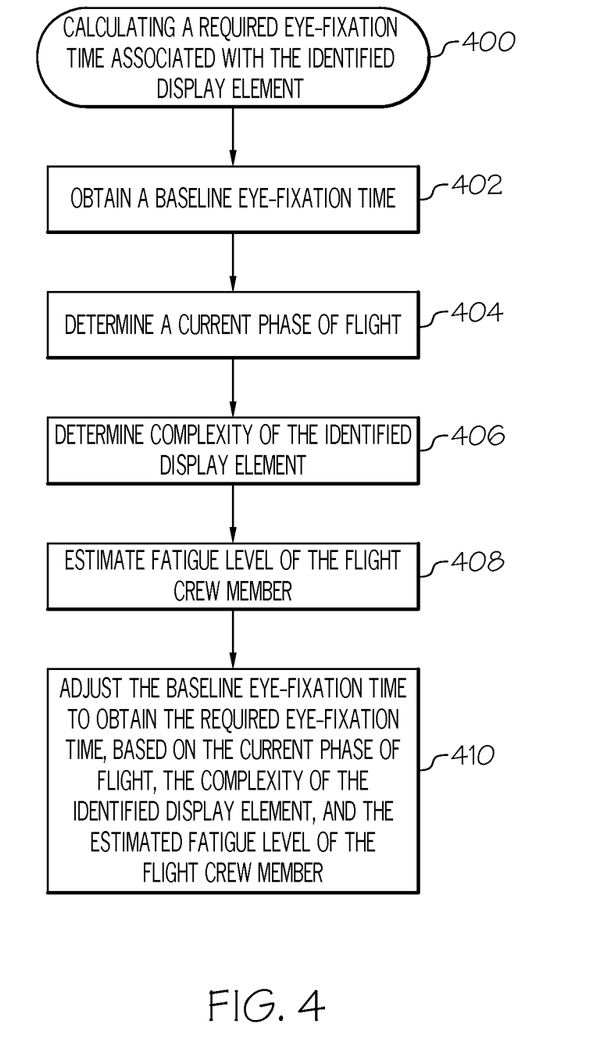
FIG. 4 is a flowchart that illustrates an embodiment of a process for calculating a required eye-fixation time associated with an identified display element.

FIG. 4 is a flowchart that illustrates an embodiment of a process 400 for calculating a required eye-fixation time associated with an identified display element. It should be appreciated that the process 400 described in FIG. 4 represents one embodiment of step 302 described above in the discussion of FIG. 3, including additional detail. First, the process 400 obtains a baseline eye-fixation time (step 402). The baseline eye-fixation time is a parameter set during design, and represents the minimum eye-fixation time for the least complex display elements inside an aircraft. The baseline eye-fixation time is adjusted (e.g., increased) due to an assessed ability of the flight crew member to become aware of the system-initiated change. This ability of the flight crew member to comprehend the presented information may be assessed using one or more factors, the factors including, without limitation: complexity of display elements, phases of flight requiring an elevated workload, and/or a high fatigue level of a flight crew member. The baseline eye-fixation time is generally retrieved from system memory for use in calculations.

Next, the process 400 determines a current phase of flight (step 404). Generally, the phase of flight is obtained from the flight management system (FMS). An estimate of flight crew workload can be derived from the current phase of flight. Phases of flight may include, without limitation: Pre-flight, Engine Start, Pushback, Taxi, Take-off, Climb, Cruise, Descent, Holding, Approach, Final Approach, Landing, Taxi and Post Flight Operations. Each phase of flight is associated with specific tasks for completion within a specific period of time. Certain phases of flight (e.g., Take-off and Final Approach) include a large number of tasks that must be completed and require significant amount of concentration to complete. Flight crew members are more likely to quickly visualize and comprehend new information presented via displays during low workload phases, such as Cruise. Similarly, flight crew members are less likely to quickly visualize and comprehend new information presented during high workload phases.

The process 400 then determines a complexity of the identified display element associated with an eye-scanning region (step 406). The complexity of a display element indicates the presence of visual characteristics that would increase the time required for a flight crew member to recognize and evaluate the information presented on the display element. Such visual characteristics may include, without limitation: a particular display element being located among a large number of other display elements within a small area; a particular display element presenting a large amount of varied information; a particular display element presenting information in such a way as to require intense concentration to discern current operating conditions, changes that may have occurred, and/or potential changes that must occur to provide ideal operating conditions, or the like. In certain embodiments, each display element, or combination of elements, has an associated complexity rating stored in system memory. The complexity rating may include a binary scale, such as high or low, or may include a rating system, such as a scale of 1 to 10. Some embodiments may include other forms of complexity evaluation that is consistently applied to all display elements in the aircraft, including enough granularity to produce variation in the results.

Next, the process 400 estimates a fatigue level of the flight crew member (step 408). Flight crew member fatigue level may be determined using known techniques and technology in the art. One example of such may be found in U.S. Patent Application Publication No. 2013/0323688 A1, incorporated by reference herein.

The process 400 then adjusts the baseline eye-fixation time to obtain the required eye-fixation time, based on the current phase of flight, the complexity of the identified display element, and the estimated fatigue level of the flight crew member (step 410). For example, a baseline eye-fixation time retrieved from system memory may be 1300 milliseconds (ms). In a situation including Cruise phase of flight, the process 400 would not increase the baseline eye-fixation time, due to the low workload during this particular phase of flight. If the flight crew member is determined to have a low or non-existent fatigue level, the baseline eye-fixation time will not be increased. If the display element is determined to be simple, then the process 400 will not increase the baseline eye-fixation time. Here, the required eye-fixation time is determined using the following formula: 1300 ms+0+0+0=1300 ms.

In another example, the baseline eye-fixation time retrieved from system memory may again be 1300 ms. If the flight crew member is fatigued, then the baseline eye-fixation time is increased. If the display element is complex, then the baseline eye-fixation time is increased. If the current phase of flight is Final Approach, then the baseline eye-fixation time will be increased accordingly. Generally, each factor is increased by a pre-determined amount of time, which is retrieved from system memory when required. For purposes of simplicity in explanation, each factor may be associated with a 0 ms increase when there are no indications of increased workload (as in the example above), and each factor may be associated with a 100 ms increase when an increased workload is indicated. Here, the required eye-fixation time is determined using the following formula: 1300 ms+100 ms+100 ms+100 ms=1600 ms.

Figure 5:
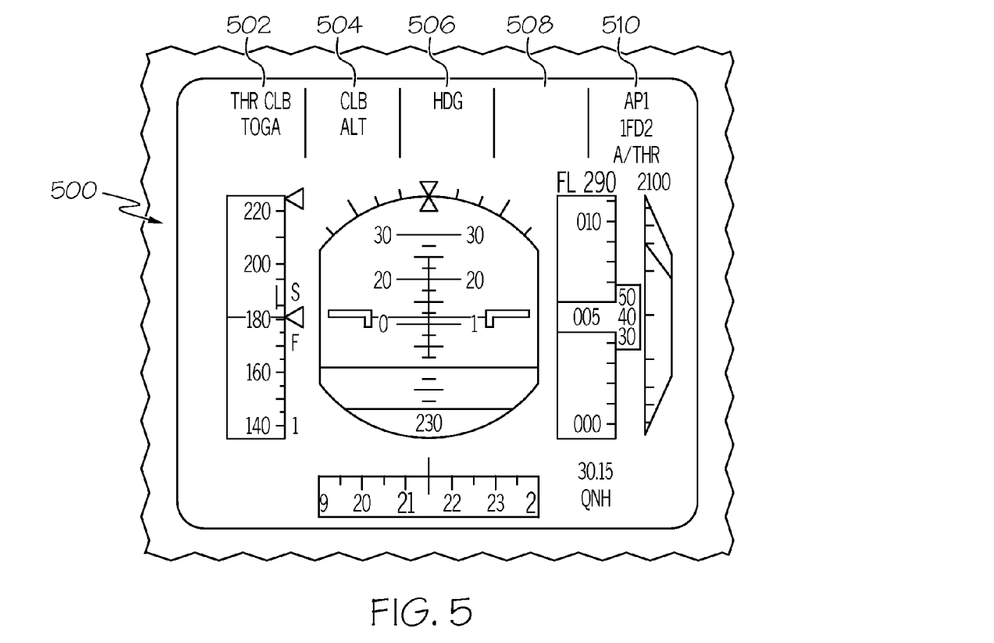
FIG. 5 is a schematic representation of a flight mode annunciator, in accordance with an embodiment.
Figure 6:
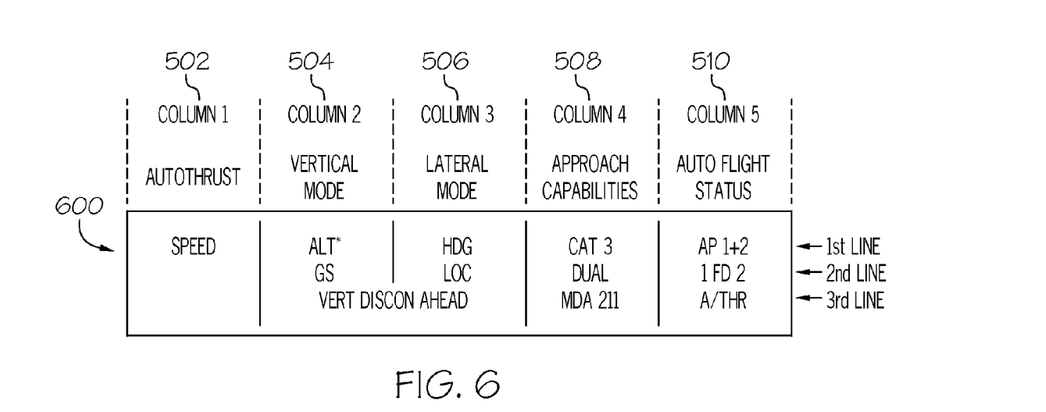
FIG. 6 is an annotated diagram of a top portion of a flight mode annunciator, in accordance with an embodiment.

FIG. 5 is a schematic representation of a flight mode annunciator 500, in accordance with an embodiment. A flight mode annunciator 500 is a display element inside a typical aircraft, and indicates current flight modes on top of a Primary Flight Display (PFD). FIG. 6 is an annotated diagram of a top portion 600 of a flight mode annunciator (shown as reference 500 in FIG. 5). The top portion 600 of the flight mode annunciator has five columns, which are used to present data related to current flight modes of an aircraft. As shown, the current Autothrust Mode 502 is shown in column 1; the current Vertical Mode 504 is shown in column 2; the current Lateral Mode 506 is shown in column 3; the current Approach Capabilities 508 are shown in column 4; and the current Auto Flight Status 510 is shown in column 5.

Figure 7:
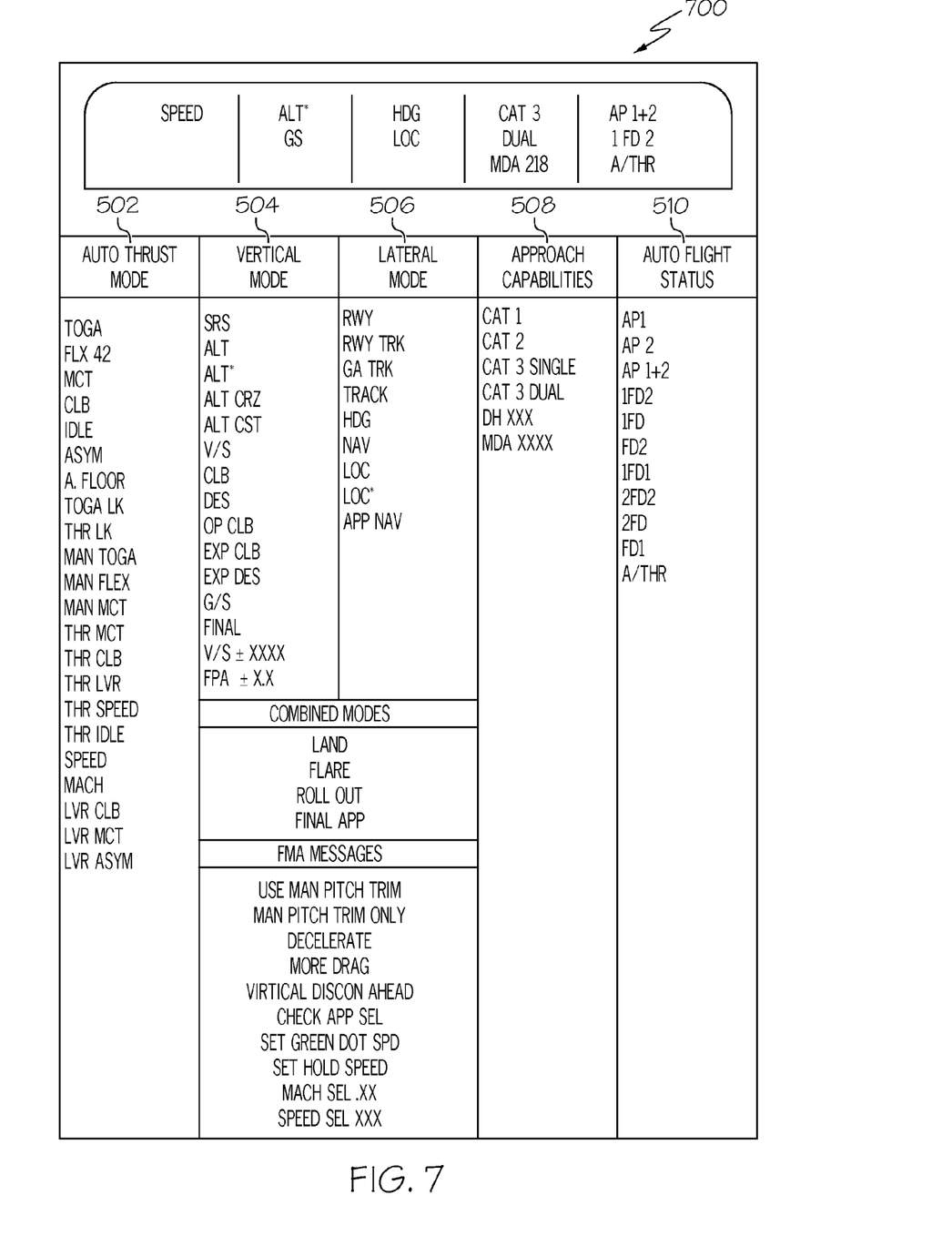
FIG. 7 is a diagram of a table illustrating flight mode options, in accordance with an embodiment.

FIG. 7 is a diagram of a table 700 illustrating flight mode options, in accordance with an embodiment. The table 700 presents the possible flight modes for each column. The columns are arranged in the same order as FIGS. 5 and 6 (e.g., Autothrust Mode 502 is shown in column 1; Vertical Mode 504 is shown in column 2; Lateral Mode 506 is shown in column 3; Approach Capabilities 508 is shown in column 4; and Auto Flight Status 510 is shown in column 5). However, instead of depicting current settings for each column, each column of the table 700 shows the possible settings for that particular column, for a particular embodiment in a particular aircraft. As shown, there are multiple possible combinations that could be displayed on a flight mode annunciator display element (shown as reference 500 in FIG. 5).

For purposes of the present application, a flight mode annunciator is considered cognitively complex. As shown, there are five categories (columns), each with three lines. Each line has multiple potential individual states, and the entire flight mode annunciator display has thousands of potential combinations for a flight crew to visually parse and comprehend.

Figure 8:
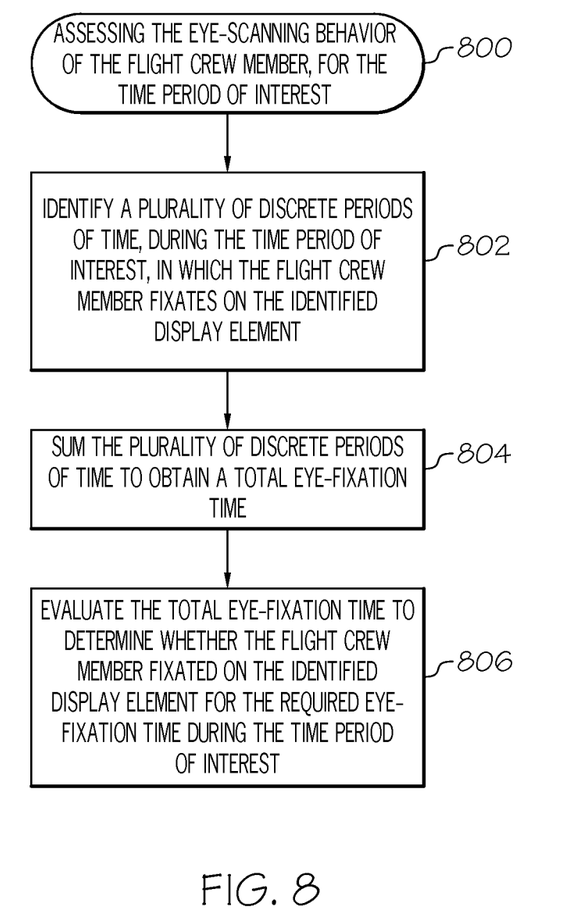
FIG. 8 is a flowchart that illustrates an embodiment of a process for assessing the eye-scanning behavior of the flight crew member for the time period of interest.

FIG. 8 is a flowchart that illustrates an embodiment of a process for assessing the eye-scanning behavior of the flight crew member for the time period of interest. It should be appreciated that the process 800 described in FIG. 8 represents one embodiment of step 306 described above in the discussion of FIG. 3, described in additional detail. First, the process 800 identifies a plurality of discrete periods of time, during the time period of interest, in which the flight crew member fixates on the identified display element (step 802). During operation of the aircraft, the flight crew member may glance at a display element, look away, and look back at the display element one or more times. Each discrete period of time begins at a point in time at which the flight crew member begins to look at the display element, and ends when the flight crew member looks away from the display element. The process 800 then sums the plurality of discrete periods of time to obtain a total eye-fixation time (step 804).

After obtaining the total eye-fixation time (step 804), the process 800 evaluates the total eye-fixation time to determine whether the flight crew member fixated on the identified display element for the required eye-fixation time during the time period of interest (step 806). The process 800 returns to the method described with regard to FIG. 3, to compare the total eye-fixation time to the required eye-fixation time to determine awareness, or lack of awareness, of the flight crew member.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for assessing and responding to a level of awareness of a flight crew member onboard an aircraft, the method comprising:
    assessing an eye-scanning behavior of the flight crew member to determine whether the flight crew member is aware of a system-initiated change to a flight parameter, the eye-scanning behavior comprising eye position, gaze direction, and eye movements of the flight crew member; and
    when the flight crew member is not aware of the system-initiated change, orienting the flight crew member to the system-initiated change.

2. The method claim 1, wherein the method further comprises:
    monitoring an avionics communication bus onboard the aircraft;
    identifying a modification to an existing flight mode, via the monitored avionics communication bus; and
    determining that the modification was automatically executed;
    wherein the automatically executed modification comprises the system-initiated change; and
    wherein the flight mode comprises a set of control settings for an automatic flight system (AFS) which controls the aircraft in pitch, roll and yaw axes as well as thrust settings.

3. The method of claim 2, further comprising:
    when the flight crew member is aware of the system-initiated change, continuing to monitor the avionics communications bus onboard the aircraft.

4. The method of claim 1, wherein the assessing step further comprises:
    identifying an eye-scanning region, onboard the aircraft, related to the system-initiated change to a flight parameter;
    calculating a minimum amount of time that indicates awareness of the flight crew member regarding the system-initiated change; and
    assessing the eye-scanning behavior of the flight crew member to determine whether the flight crew member fixated on the eye-scanning region for at least the minimum amount of time.

5. The method of claim 4, wherein the assessing step further comprises:
    assessing the eye-scanning behavior for a time period of interest, to determine whether the flight crew member fixated on the eye-scanning region for the required eye-fixation time during the time period of interest;
    wherein the time period of interest begins upon occurrence of the system-initiated change and the end point comprises a dynamic value that is function of time sensitivity of detected change, current estimate of pilot workload, and complexity of display elements that depicts the change.

6. The method of claim 5, wherein the assessing step further comprises:
    identifying a plurality of discrete periods of time, during the time period of interest, in which the flight crew member fixates on the eye-scanning region;
    summing the plurality of discrete periods of time to obtain a total eye-fixation time; and
    evaluating the total-eye fixation time to determine whether the flight crew member fixated on the eye-scanning region for the required eye-fixation time during the time period of interest.

7. The method of claim 4, wherein the calculating step further comprises:
  obtaining a baseline eye-fixation time; and
  adjusting the baseline eye-fixation time to determine the required eye-fixation time, based on at least one factor;
  wherein the at least one factor indicates an ability of the flight crew member to become aware of the system-initiated change.

8. The method of claim 7, wherein the adjusting step further comprises:
  determining a current phase of flight, wherein the at least one factor comprises the determined current phase of flight; and
  adjusting the baseline eye-fixation time based on the determined current phase of flight.

9. The method of claim 7, wherein the eye-scanning region comprises a display element; and
  wherein the adjusting step further comprises:
    determining complexity of the display element, wherein the at least one factor comprises the determined complexity of the display element; and
    adjusting the baseline eye-fixation time based on the determined complexity of the display element.

10. The method of claim 7, wherein the adjusting step further comprises:
  estimating fatigue of the flight crew member, wherein the at least one factor comprises the estimated fatigue of the flight crew member; and
  adjusting the baseline eye-fixation time based on the estimated fatigue of the flight crew member.

11. A system for determining and responding to a level of awareness of a flight crew member with regard to system-initiated changes onboard an aircraft, the system comprising:
  a flight parameter analysis module, configured to identify an automatically executed conversion of an existing flight mode of the aircraft;
  an eye-tracking module, configured to sense an eye-scanning behavior of the flight crew member inside the aircraft, the eye-scanning behavior comprising eye position, gaze direction and eye movements of the flight crew member;
  a data analysis module, configured to evaluate the eye-scanning behavior of the flight crew member to determine awareness of the flight crew member of the automatically executed conversion of the existing flight mode; and
  a notification module, configured to orient the flight crew member to the automatically executed conversion of the existing flight mode, when the data analysis module determines that the flight crew member is unaware of the automatically executed conversion.

12. The system of claim 11, wherein the data analysis module is further configured to:
  identify a display element related to the automatically executed conversion of an existing flight mode;
  calculate a required eye-fixation time associated with the identified display element; and
  evaluate the eye-scanning behavior of the flight crew member to determine whether the flight crew member fixated on the identified display element for the required eye-fixation time;
  wherein the required eye-fixation time comprises a minimum amount of time that indicates awareness of the flight crew member regarding the system-initiated change.

13. The system of claim 11, wherein the notification module is further configured to orient the flight crew member to the automatically executed conversion of an existing flight mode using a visual or auditory alert.

14. A non-transitory, computer-readable medium containing instructions thereon, which, when executed by a processor, perform a method comprising:
  determining, with an onboard monitoring subsystem of an aircraft, that a flight crew member is unaware of a system-initiated change to an operating parameter by analyzing eye-scanning behavior of the flight crew member, wherein the eye-scanning behavior comprises eye position, gaze direction and eye movements of the flight crew member; and
  presenting a notification of the system-initiated change to the flight crew member.

15. The non-transitory, computer-readable medium of claim 14, wherein the determining step further comprises:
  detecting occurrence of the system-initiated change;
  identifying a region in the aircraft associated with the system-initiated change, wherein awareness of the system-initiated change requires visual attention to the region; and
  sensing a lack of user visual attention toward the region.

16. The non-transitory, computer-readable medium of claim 14, wherein the determining step further comprises:
  identifying a display element related to the system-initiated change to an operating parameter;
  calculating a required eye-fixation time associated with the identified display element; and
  assessing the eye-scanning behavior of the flight crew member to determine whether the flight crew member fixated on the identified display element for the required eye-fixation time;
  wherein the required eye-fixation time comprises a minimum amount of time that indicates awareness of the flight crew member regarding the system-initiated change.

17. The non-transitory, computer-readable medium of claim 16, wherein the calculating step further comprises:
  obtaining a baseline eye-fixation time; and
  adjusting the baseline eye-fixation time to determine the required eye-fixation time, based on at least one factor;
  wherein the at least one factor indicates an ability of the flight crew member to become aware of the system-initiated change.

18. The non-transitory, computer-readable medium of claim 17, wherein the adjusting step further comprises:
  determining a current phase of flight, wherein the at least one factor comprises the determined current phase of flight; and
  adjusting the baseline eye-fixation time based on the determined current phase of flight.

19. The non-transitory, computer-readable medium of claim 17, wherein the adjusting step further comprises:
  determining complexity of the identified display element, wherein the at least one factor comprises the determined complexity of the identified display element; and
  adjusting the baseline eye-fixation time based on the determined complexity of the identified display element.

20. The non-transitory, computer-readable medium of claim 17, wherein the adjusting step further comprises:
  estimating fatigue of the flight crew member, wherein the at least one factor comprises the estimated fatigue of the flight crew member; and
  adjusting the baseline eye-fixation time based on the estimated fatigue of the flight crew member.

* * * * *